United States Patent
Kavanagh et al.

[11] Patent Number: 5,865,520
[45] Date of Patent: Feb. 2, 1999

[54] PROJECTION SYSTEM

[75] Inventors: Martin Kavanagh, Lancashire; Raymond Gordon Fielding, Oldham; Graham Harry Moss, Chadderton, all of United Kingdom

[73] Assignee: Digital Projection Limited, England

[21] Appl. No.: 696,860

[22] PCT Filed: Feb. 21, 1995

[86] PCT No.: PCT/GB95/00359

§ 371 Date: Oct. 21, 1996

§ 102(e) Date: Oct. 21, 1996

[87] PCT Pub. No.: WO95/22868

PCT Pub. Date: Aug. 24, 1995

[30] Foreign Application Priority Data

Feb. 22, 1994 [GB] United Kingdom .................. 9403389
Feb. 23, 1994 [GB] United Kingdom .................. 9403413

[51] Int. Cl.[6] ........................................ G03B 21/28
[52] U.S. Cl. ........................ 353/31; 353/33; 348/771
[58] Field of Search .................... 353/33, 34, 81, 353/99, 122; 348/771, 743; 345/108; 349/8

[56] References Cited

U.S. PATENT DOCUMENTS

| | | |
|---|---|---|
| 4,268,119 | 5/1981 | Hartmann . |
| 5,309,188 | 5/1994 | Burstyn ........................ 353/33 |
| 5,402,184 | 3/1995 | O'Grady et al. . |
| 5,420,655 | 5/1995 | Shimizu ........................ 353/34 |
| 5,552,922 | 9/1996 | Magarill ........................ 353/81 |
| 5,604,624 | 2/1997 | Magarill ........................ 353/81 |
| 5,658,060 | 8/1997 | Dove ........................ 353/33 |
| 5,704,701 | 1/1998 | Kavanagh et al. ........................ 353/33 |

FOREIGN PATENT DOCUMENTS

| | | |
|---|---|---|
| 0 401 912 | 12/1990 | European Pat. Off. . |
| 0 511 829 A3 | 11/1992 | European Pat. Off. . |
| 24 58 663 | 6/1975 | Germany . |
| 30 19 089 | 11/1981 | Germany . |
| 983933 | 2/1965 | United Kingdom . |
| 1251482 | 10/1971 | United Kingdom . |
| 1474699 | 5/1977 | United Kingdom . |
| 2148026 | 5/1985 | United Kingdom . |
| 92/13424 | 8/1992 | WIPO . |
| 93/18620 | 9/1993 | WIPO . |

OTHER PUBLICATIONS

Patent Abstracts of Japan vol. 018 No. 478 (P–1796), Sep. 6, 1994 & JP,A,06 160611 (Canon Inc.) Jun. 7, 1994.
Patent Abstracts of Japan vol. 018 No. 657 (P–1842), Dec. 13, 1994 & JP,A,06 258507 (Canon Inc.) Sep. 16, 1994.

Primary Examiner—William Dowling
Attorney, Agent, or Firm—Lerner, David, Littenberg, Krumholz & Mentlik

[57] ABSTRACT

A projection system includes a light source (16) and a prism assembly (41) including at least one air gap (45) effective both to deflect incident light on to at least one reflective spatial light modulator (10), and to transmit modulated light produced by the spatial light modulator (10).

16 Claims, 18 Drawing Sheets

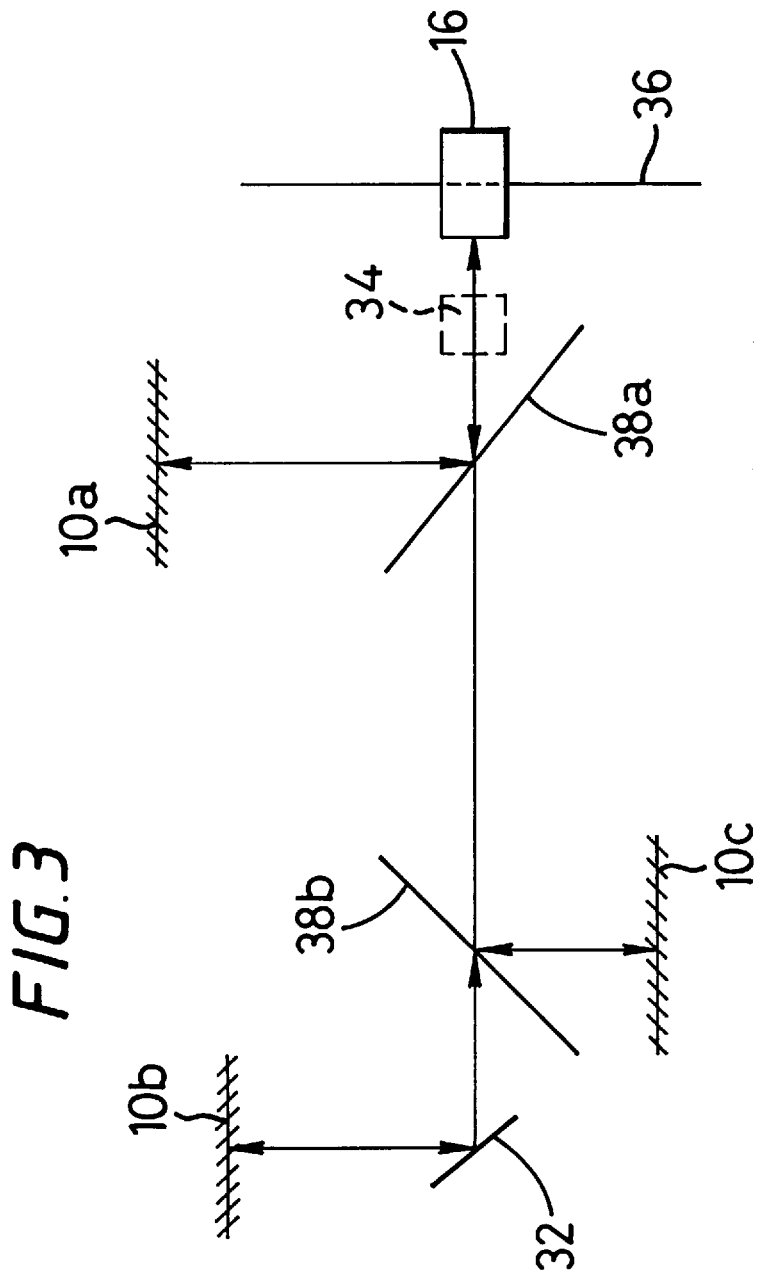

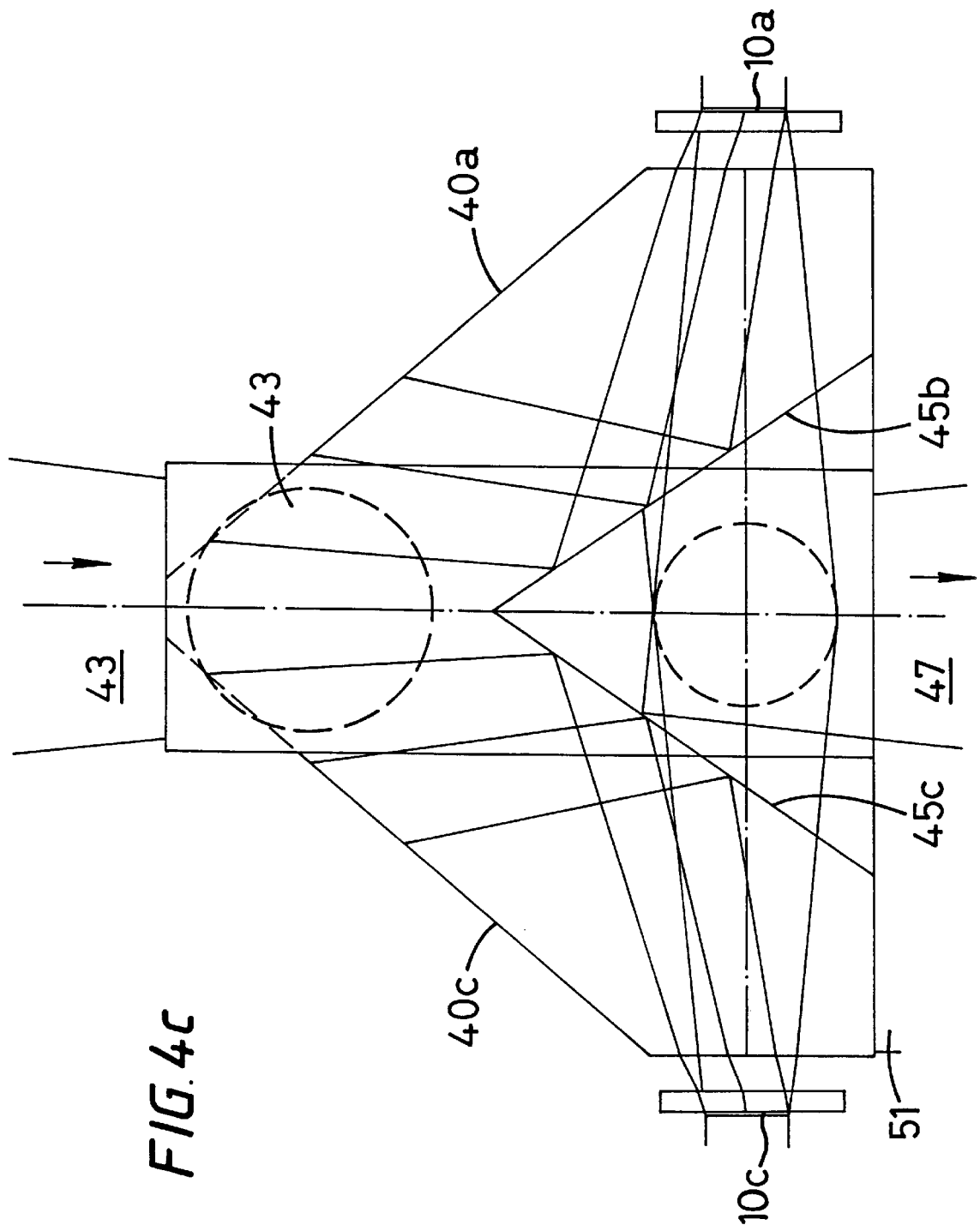

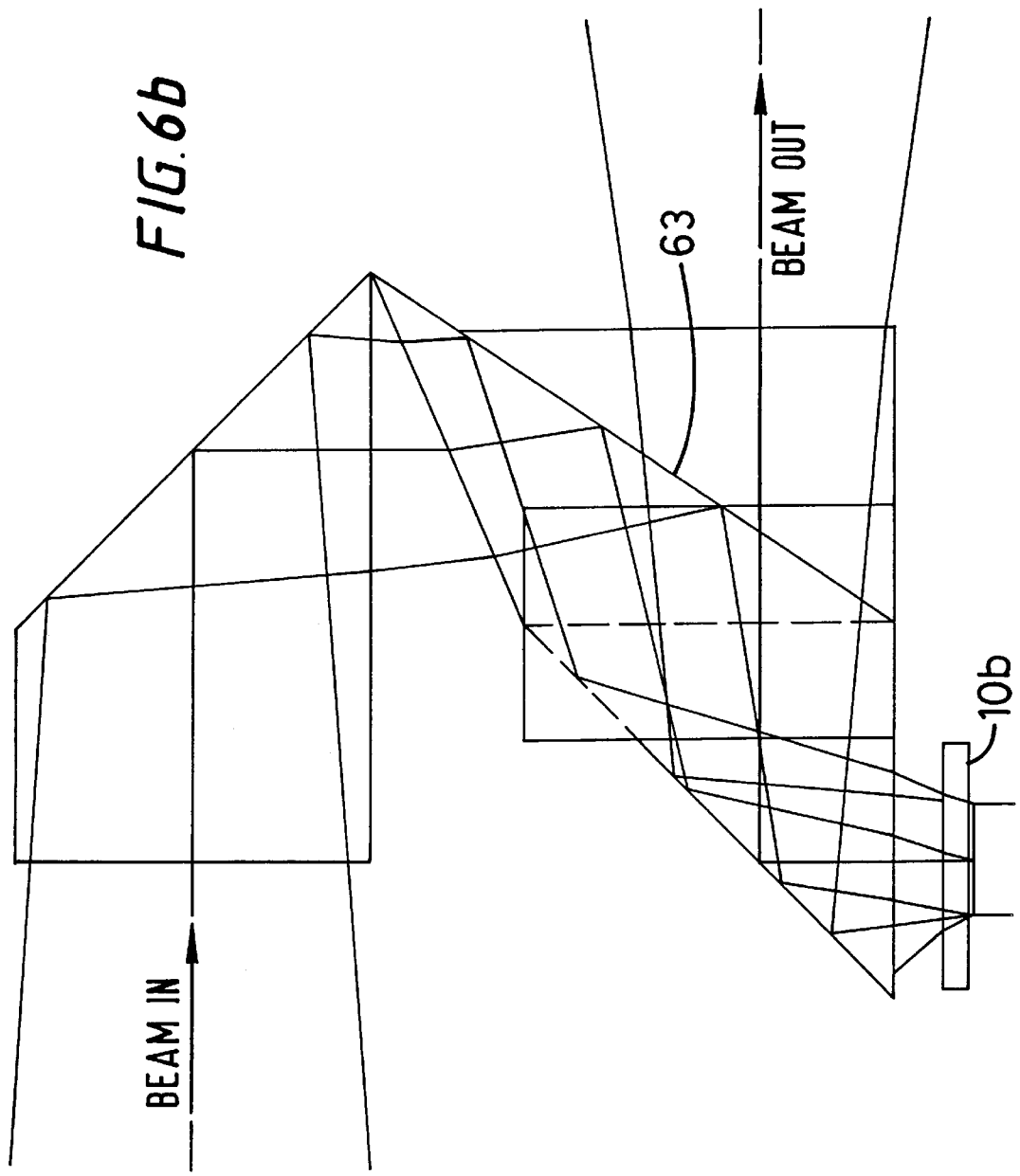

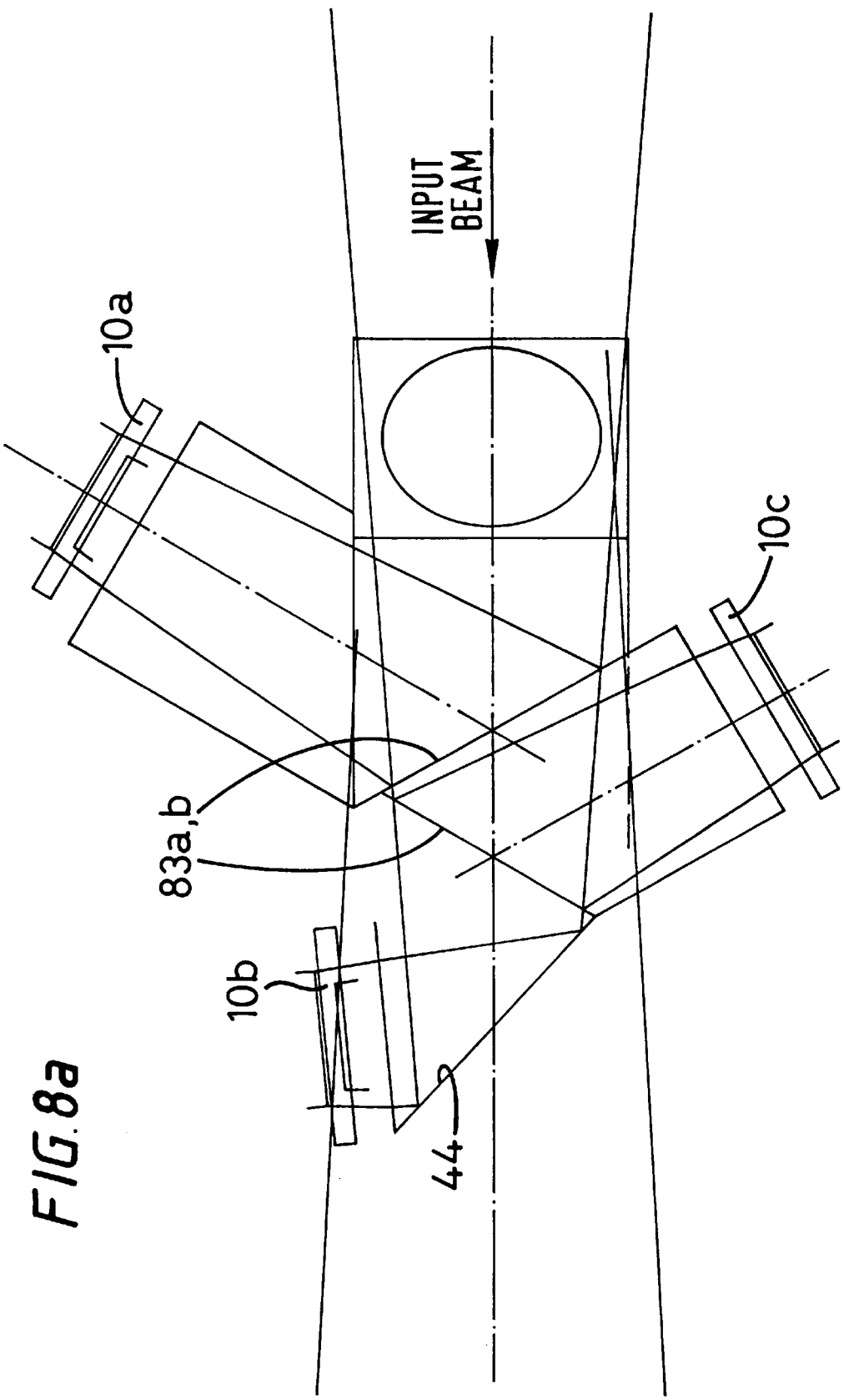

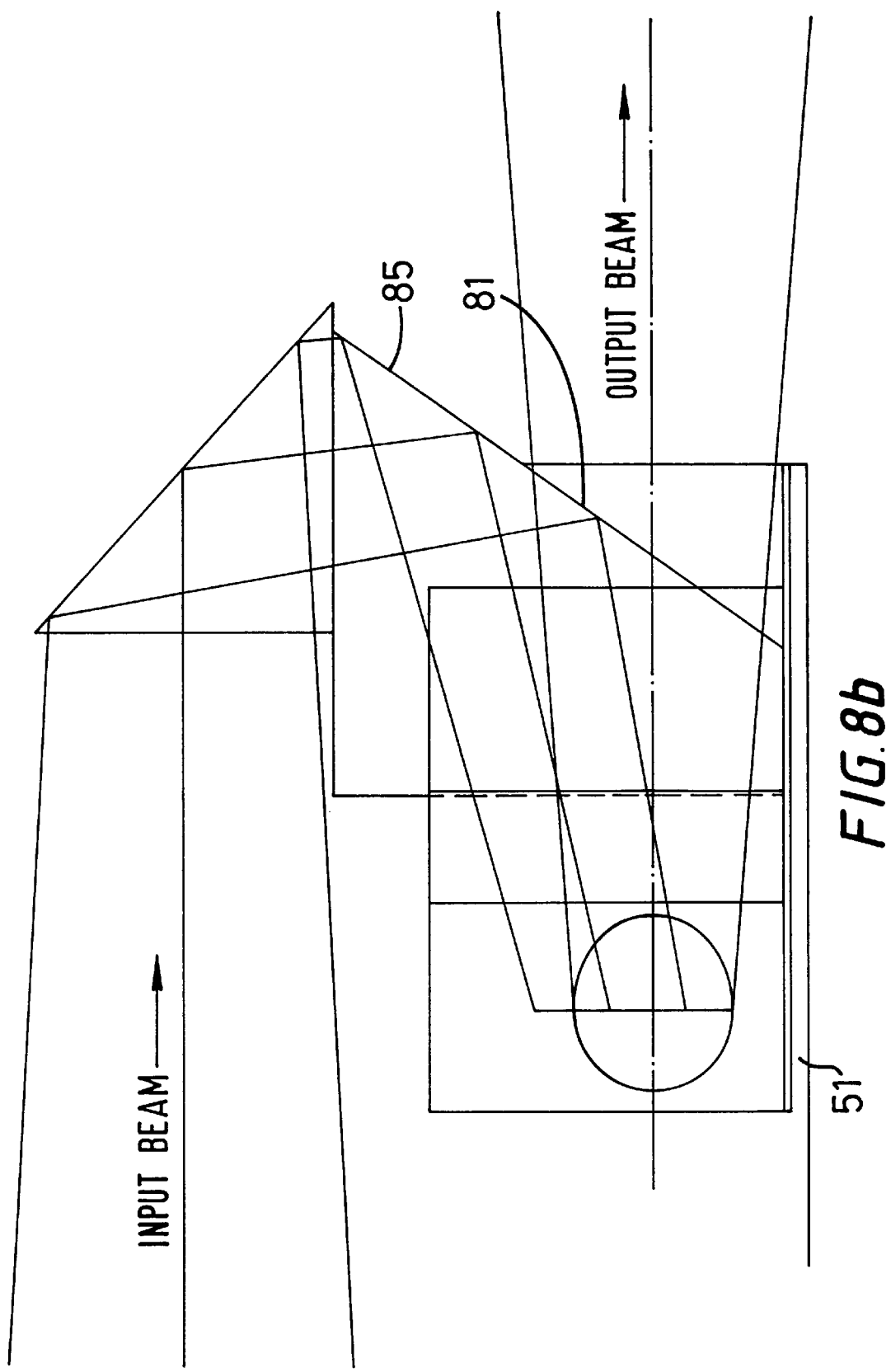

PROJECTION SYSTEM

This invention relates to a projection system. In particular, the invention relates to a projection system in which a projected display is formed by spatially modulating light from a light source by one or more spatial light modulator devices, and then projecting the spatially modulated light on to a display area. The invention has particular, although not exclusive relevance to a colour projection system in which beams of light of different colour are directed onto different spatial light modulator devices, and the modulated beams are combined to form a single projected colour display.

A spatial light modulator is an optical component which is controllable to spatially modulate an incident light beam. One class of spatial light modulators are active matrix devices, which comprise a matrix of individually addressed pixels, each pixel comprising a light modulator. Each light modulator may be a liquid crystal, for example as shown in EP 0401912. Alternatively the active matrix device may comprise an array of the tiltable mirror devices as, for example described in U.S. Pat. No. 4856863, U.S. Pat. No. 4615595 and U.S. Pat. No. 4596992. Such tiltable mirror devices comprise miniature mirrored cantilever beam elements which are electrostaticaly deflectable by electric fields provided across a corresponding array of electrodes. The extent of the deflection can be controlled by means of the applied electrostatic potential to provide variable degrees of deflection. Alternatively the tiltable mirror devices can be operated in a binary manner by applying predetermined electrostatic potentials to switch each mirror device between discrete deflection states. Each mirror device angularly deflects an incident light beam, directing the light beam either towards a projection screen or towards a beam dump.

Using an array of such mirror devices, each device being individually addressable, a two dimensional image can be produced. The small size and fast switching times of the mirror devices make them usable at video picture data rates, enabling the display of television or video moving images on the display screen.

In order to display a colour image three separately illuminated arrays of mirror devices may be provided, each array being responsive to light of a different primary colour or primary colour combination, the modulated beams reflected from each device then being combined optically and projected onto a single optical display. Alternatively a single array may be illuminated with different coloured light in sequence (for example using a colour wheel) and the integrating response of an observer's eyes may be relied on to provide a full colour image to the observer.

In our copending International Application PCT WO093/18620 (the contents of which are incorporated herein by reference) there is described a spatial light modulator system comprising a light source, means for splitting light from the source into different colour component beams, and a plurality of deformable mirror spatial light modulators. The light paths between the light source and the means for splitting light and the spatial light modulators are defined within a single prism on which the spatial light modulators are mounted, thus minimising the size of the optical system and providing stability to the system.

The incident beam does not scan, as does an electron beam in a cathode ray tube, but illuminates the whole array of mirror devices. Thus a projection system including one or more deformable mirror devices suffers the disadvantage that it is necessary to space the light source and the projection system such that the light paths of light from the source to the prism assembly, and the modulated light transmitted by the prism assembly to the projector system do not cross. This produces limitations on the compactness and efficiency of the system which can be produced.

It is an object of the present invention to provide a spatial light modulator system in which this problem can be at least alleviated.

According to a first aspect of the present invention there is provided a projection system comprising a light source, means for splitting light from the source into different colour component beams, and a plurality of reflective spatial light modulators wherein the means for splitting light from a source into different colour component beams are incorporated in a single prism assembly, the prism assembly including at least one air gap effective to deflect incident light onto at least one of the spatial light modulators and to transmit spatially modulated light produced by the spatial light modulator.

According to a second aspect of the present invention there is provided a prism assembly for use in a projection system, the prism assembly including at least one air gap effective to deflect incident light onto at least one reflective spatial light modulator, and to transmit spatially modulated light produced by the spatial light modulator to a display arrangement.

The prism assembly may incorporate colour splitting elements effective to separate incident light within different wavelength bands into separate beams comprising light of each wavelength band.

The spatial light modulators may be deformable mirror devices. Alternatively the spatial light modulators may be reflective liquid crystal devices.

In one particular embodiment in accordance with the invention, there are provided an equal number of air gaps to the number of spatial light modulators.

Alternatively a single air gap may be used to deflect light onto and deflect light from a plurality of spatial light modulators.

The means for splitting light may be arranged sequentially, or in a crossed configuration (in order to save space), or in a sequential crossed configuration.

In a further aspect of the invention there is provided a projection system including a dichroic surface effective to split incident light within different wavelength bands, and subsequently recombine the light after reflection from a reflective spatial light modulator, wherein the dichroic surface extends in a direction parallel to the plane containing the beams incident onto and reflected from the spatial light modulator, and the dichroic surface is arranged to have different characteristics at the regions at which the light is split and recombined.

A number of embodiments of the invention will now be described, by way of example only, with reference to the accompanying drawings in which:

FIG. 3 is a plan schematic view of a colour optical projection display system incorporating the array of FIGS. 1 and 2;

FIG. 4b shows a schematic and simplified side elevation of the part of the system shown in FIG. 4a;

FIG. 4c shows an end elevation of part of the system shown in FIG. 4a;

FIG. 6b shows a schematic side elevation of part of the system shown in FIG. 6a;

FIG. 6c shows an end elevation of part of the system shown in FIG. 6a;

FIG. 8a shows a scaled plan view of part of a fourth embodiment of a system in accordance with the invention;

FIG. 8b shows a side view of the part of the system shown in FIG. 8a;

FIG. 10b shows a side view of the embodiment of FIG. 10a;

FIG. 10c shows an end view of the embodiment of FIG. 10a;

OVERALL OPERATION OF PROJECTION SYSTEM

Figure 1:
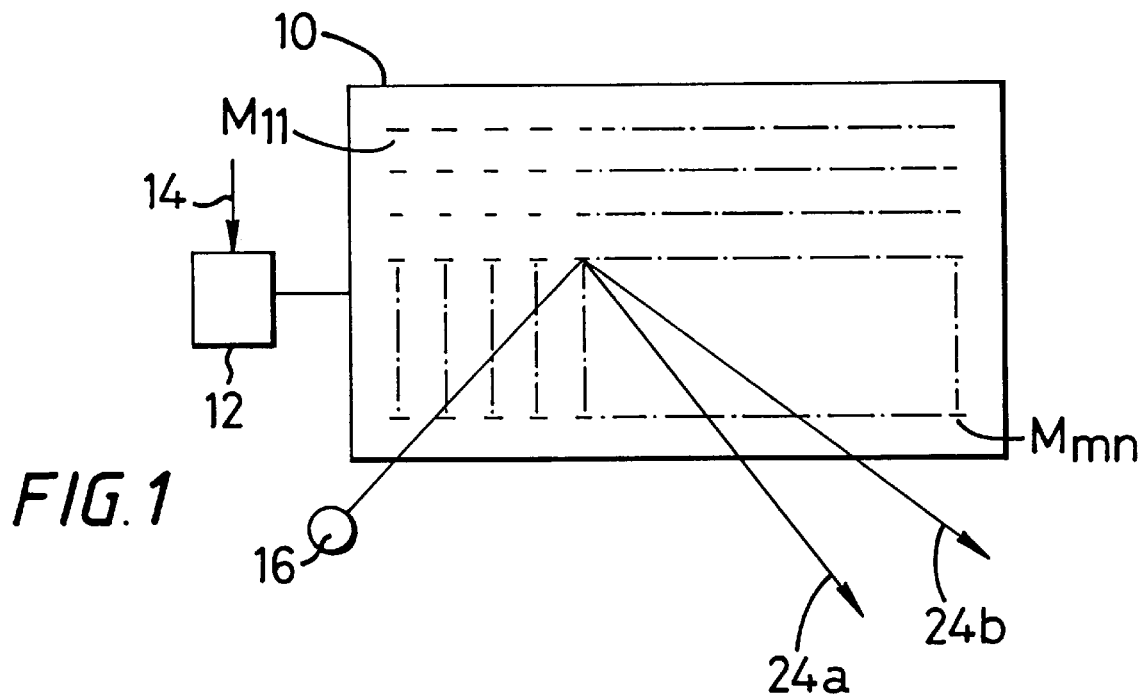
FIG. 1 shows schematically the structure of a spatial light modulator array device.

Referring to FIG. 1, a deformable mirror device array for use in a system in accordance with the invention comprises an array 10 of m×n deflectable mirror devices $M_{11}$–$M_{mn}$; typically, in the order of 500×500 devices for a low resolution display and 2000×2000 devices for a high resolution display. The array 10 is connected to an electrical address circuit 12 which receives a signal from an input circuit indicated as 14 to which a colour video signal is input. The address circuit 12 addresses the electrodes (not shown) of each of the respective mirror devices $M_{11}$–$M_{mn}$, as described in our earlier International application number WO92/12506, (the contents of which are incorporated herein by reference).

Figure 2:
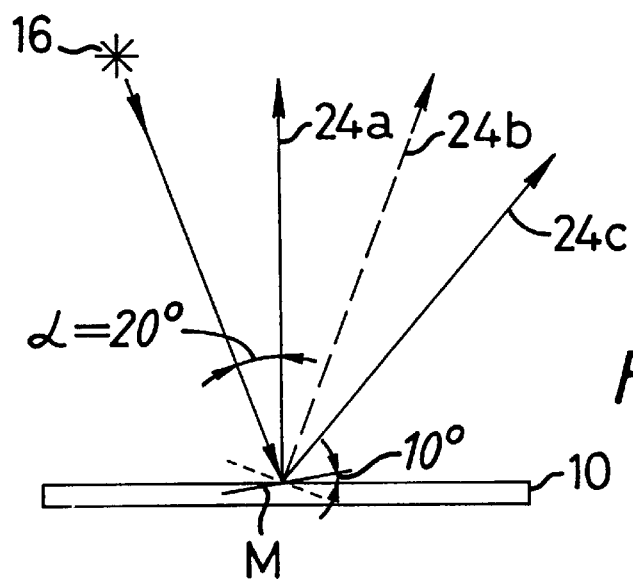
FIG. 2 shows schematically the optical illumination of a portion of the device of FIG. 1.

Referring now also to FIG. 2, an incident light beam from a light source 16 is directed towards the array 10 at an angle α (from the normal to the array) of around 20 degrees. When an individual reflector device M is lying in its rest position parallel to the plane of the array 10, the incident beam is reflected at a corresponding angle of 20° to the normal along path 24b in an "off" path leading to a beam dump (not shown). When the control signal from the addressing circuit 12 sets the mirror device M into a first deflection state at an angle of 10° to the plane of the array 10, the incident beam is reflected out along the normal angle to the array on an "on" path 24a towards a projection lens and display screen (not shown in FIG. 2 but shown in FIG. 3 as 34 and 36). When the control signal sets the mirror device M into a second deflection state at the opposite angle of 10° to the first deflection state, the incident beam is reflected out at 40° to the normal along 24c in a second "off" path also leading to a beam dump (not shown).

Thus, when viewed along the "on" path 24a, at an instant, the array 10 displays a two dimensional image, those mirror devices which have been set to the first deflection state appearing bright, and those which have been set to the second deflection state appearing dark.

Referring now particularly to FIG. 3, the system to be described is a colour projection system including three separate deformable mirror arrays 10a, 10b, 10c arranged to spatially modulate light within respectively the blue, green and red wavelength bands. This figure illustrates the principle of operation of such a colour projection system.

The light source 16, which comprises a high power lamp, is arranged to generate white light along the incident light path to the three arrays 10a, 10b, 10c each of which is of the form described in relation to array 10 in FIGS. 1 and 2. A mirror 32 is arranged to direct light from the light source 16 so as to illuminate the array 10b. The array 10b is arranged to deflect the incident beam such that the "on" path from the array 10b illuminates a projection screen 36 via the mirror 32 and a projection lens 34. The incident light path may be in a plane normal to that of the screen 1, for example by positioning the light source 16 above the display screen 36.

Positioned within the path of the incident and deflected rays are a pair of splitter/combiner mirrors 38a and 38b which are at an inclination, rotated about the vertical axis relative to the plane of the screen by an angle such as to reflect portions of the incident beam to further deformable mirror deflector arrays 10a, 10c.

The arrays 10a, 10b, 10c are positioned such that the optical path traversed from each array 10a–10c to the screen 36 is the same. The first splitter/combiner mirror 38a may reflect the blue light wavelength components of the incident beam to a deformable mirror display array 10a which is electrically addressed so as to spatially modulate the beam to correspond to the blue wavelength component of the picture to be displayed. The reflected "on" beam is deflected vertically by 20 degrees but is substantially horizontally unmodified. The splitter 38a transmits the red and green wave length components of the incident light substantially unattenuated.

The second splitter 38b may reflect red wavelength components of the incident beam to a second deformable mirror device array 10c which is electrically addressed so as to modulate the beam to correspond to the red light wavelength components of the picture to be reproduced, the reflected "on" path being deflected 20 degrees vertically. The second splitter 38b allows the green wavelengths to pass substantially unattenuated, so as to be incident on the third deformable mirror device array 10b which is electrically addressed so as to spatially modulate the beam with the green wavelength components of the picture to be reproduced.

The spatially modulated green beam is reflected by the mirror 32 so as to have the same "handedness" as the spatially modulated beams produced by the blue and red arrays and 10a, 10c which have been reflected by the mirrors 18a and 18b respectively. The spatially modulated green beam then passes unattenuated back through both splitter/combiners 38a,b through the projection lens 34 to be projected onto the screen 36. At the first splitter/combiner reached, 38b, the spatially modulated beam from the red array 10c is reflected into the same path as the spatially modulated green beam, and at the second splitter/combiner 38a the spatially modulated beam from the blue array 10a is reflected back into the same path so that the signal at the projection lens 34 comprises the recombined colour signals.

The system as so far described is known in the prior art, and suffers the disadvantage that the optical components must be widely spaced in order to prevent overlapping of the input and output beams to each spatial light modulator array 10*a,b,c*. This puts a limit on the compactness of the system which can be achieved.

FIRST EMBODIMENT

Figure 4A:
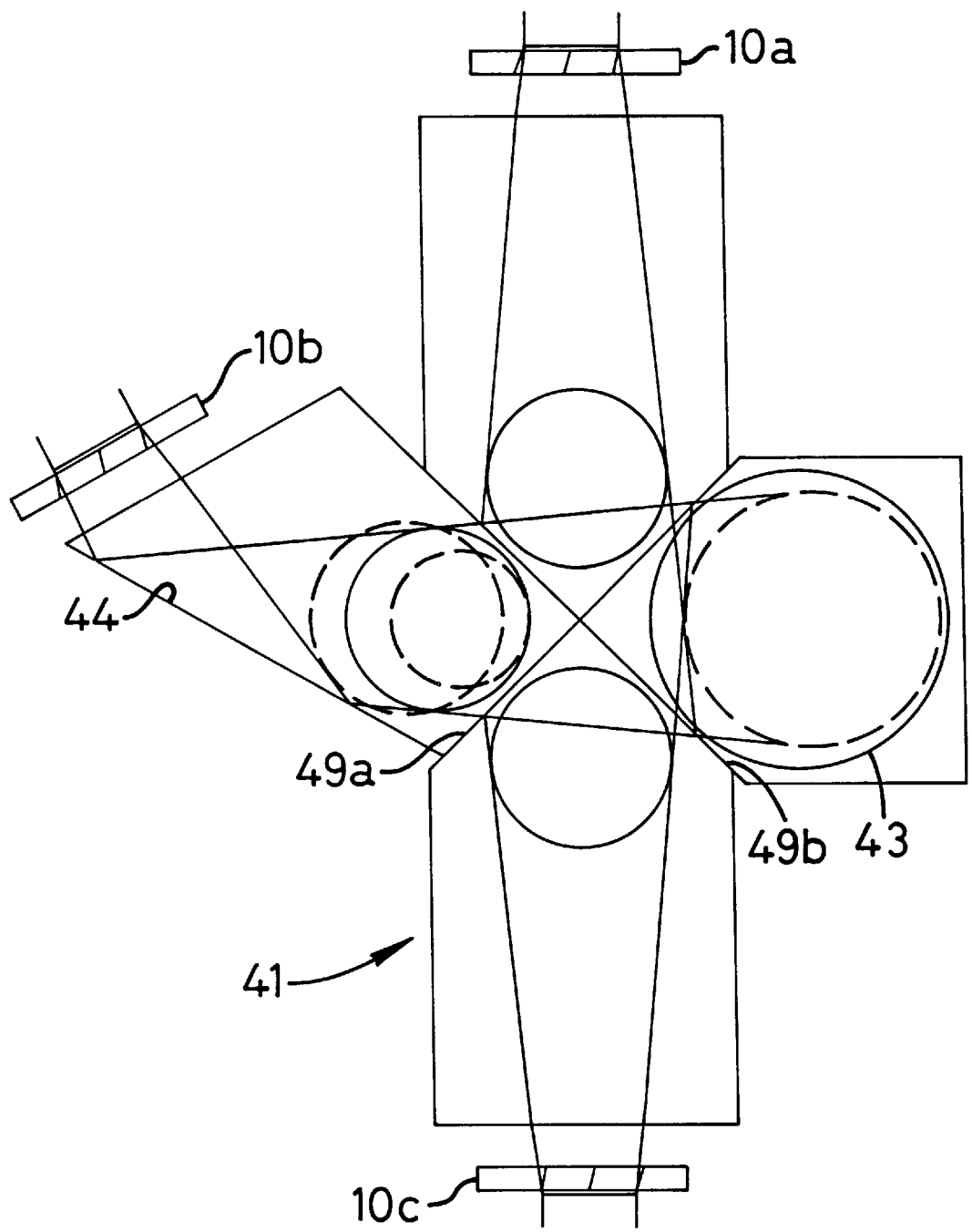
FIG. 4a shows a scaled plan view of part of a first embodiment of a spatial light modulator system in accordance with the invention.
Figure 4B:
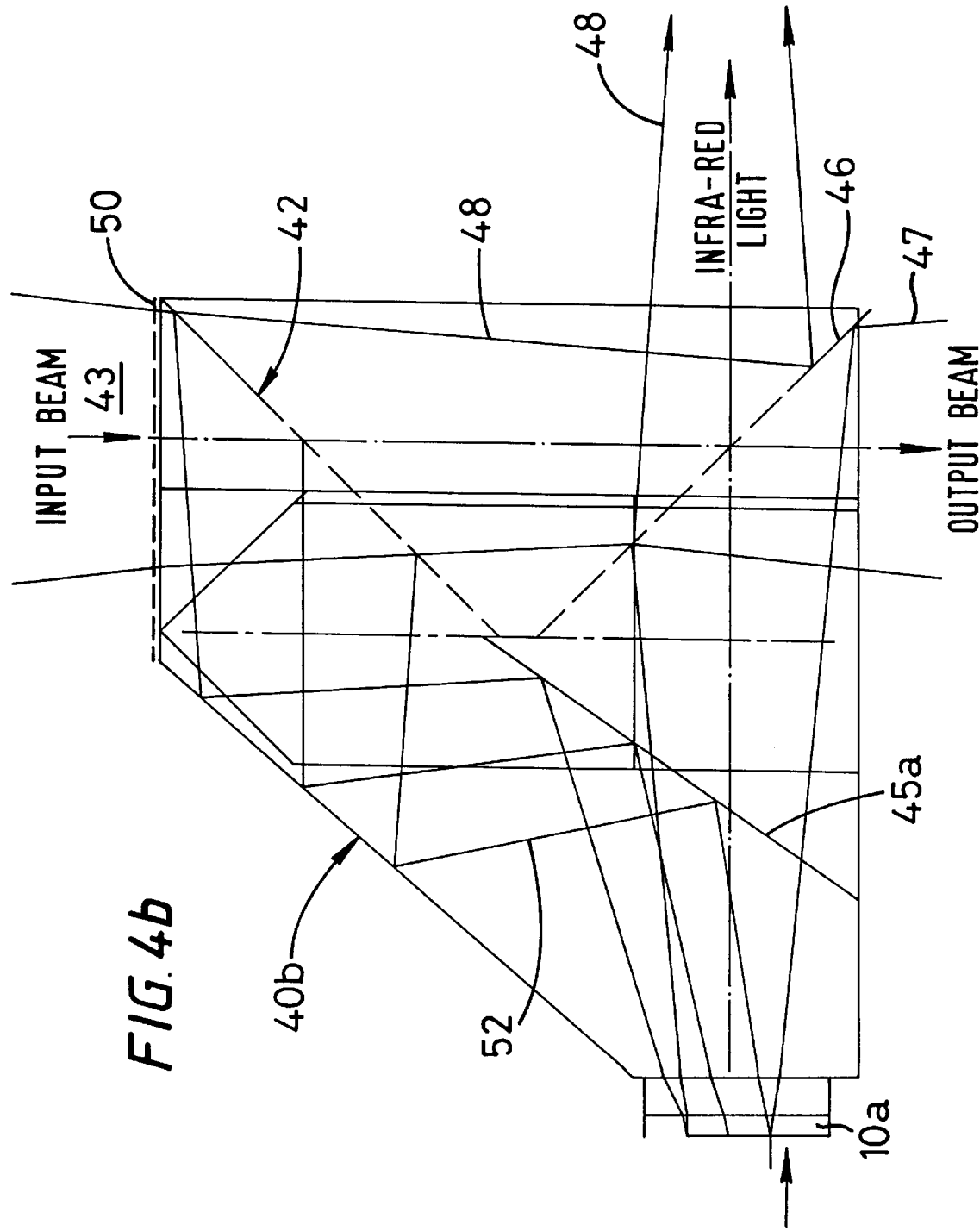

Referring now to FIGS. 4*a*, 4*b* and 4*c*, in accordance with the first embodiment of the present invention the system includes a multi-faceted prism assembly 41 provided with dichroic mirrors 49*a* and 49*b* performing the functions of the splitter/combiner mirror surfaces 38*a* and 38*b* shown in FIG. 3, together with means to fold the light from the light source 16 before it reaches the arrays 10*a*, 10*b*, 10*c*. This is achieved by the provision of three air gaps 45*a*, 45*b*, 45*c* between the components of the prism assembly 41 which serve to totally internally reflect incident light passing in one direction through the air gap as will be described in more detail hereafter.

Each array of deformable mirrors 10*a*, 10*b*, 10*c* is positioned adjacent a facet of the multi-faceted prism assembly 41. In FIG. 4*a*, the input beam to the prism assembly 41 is indicated as a circle 43 on the right hand side of the Figure.

The particular embodiment shown in FIGS. 4*a*, 4*b* and 4*c* includes a crossed dichroic mirror arrangement where surfaces 49*a, b* intersect to form a double splitter instead of being arranged in series.

The inner prism reflective surface 49*a* acts as the dichroic mirror surface 38*a* which reflects blue light to the blue array 10*a* and transmits light of other wavelengths. At the same time, the further prism surface 49*b* acts as the second dichroic mirror 38*b* which reflects red light to the red array 10*c*. Both mirror surfaces 49*a,b* transmit green light, and direct the green light towards the green array 10*b* via the total internally reflective surface 44 which is equivalent to mirror 32 in FIG. 3. For the sake of clarity the reflection caused by the surface 44 has been omitted in FIG. 4*b*.

Figure 5:
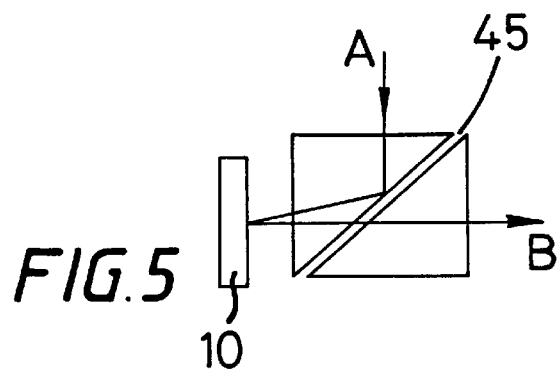
FIG. 5 is an explanatory diagram of the function of the air gaps incorporated in the embodiments.

The operation of each of the three air gaps 45*a*, 45*b*, 45*c* incorporated in the prism assembly 41 may be explained with reference to FIG. 5 which shows a single air gap 45. The air gap 45 is arranged such that the beam incident on the air gap is totally internally reflected as indicated as beam A in FIG. 5. The reflected light from the air gap then passes on to the spatial light modulator shown as 10 in FIG. 5. The reflected light from each spatial light modulator along the "on" path 24*a* shown in FIG. 2 passes back straight through the air gap 45 to emerge as beam B in FIG. 5. Such an arrangement enables the separation of the incoming and modulated beams in the prism assembly 41 in a shorter distance than would otherwise be possible. A larger aperture system is therefore practicable than would otherwise be possible.

Thus in operation of the system, turning again to FIGS. 4*a*, 4*b*, 4*c* the incoming light beam 43 is reflected by mirror 42 which is designed to reflect white light and transmit infra-red light indicated as beam 48, the infra-red light 48 then undergoing a further reflection at mirror 46 to be directed into a heat sink (not shown). The white light beam 43 is separated into three beams by the two dichroic layers 49*a,b*, and directed on to the appropriate spatial light modulator 10*a*, 10*b*, 10*c* by the three totally internally reflecting surfaces 40*a, b, c* and the three air gaps 45*a*, 45*b*, 45*c* in analogous manner to the arrangement shown in FIG. 5. The spatially modulated light is then reflected back from the spatial light modulators 10*a*, 10*b*, 10*c* back through the air gap 45*a*, 45*b*, 45*c* and subsequently directed out of the prism assembly towards the projector lens (not shown in FIG. 4*a, b, c*) by the mirror 46 to produce the spatially divergent modulated emergent beam 47 indicated in FIGS. 4*b* and 4*c*.

As seen in FIG. 4*a*, in the case of the green light which is directed onto the array 10*b*, a further reflection takes place on the internal surface 44 of the prism assembly 41. This gives the green spatially modulated light the same "handedness" as the red and the blue spatially modulated light which has undergone a reflection at mirrors 49*a* or 49*b*.

Referring primarily to FIG. 4*c*, at the base of the prism assembly, there may be provided a layer of black glass or other absorber indicated schematically as 51, bonded or fused to the base of the prism. At the other surface of the black glass layer 51, a copper heat sink or other cooling means (not shown) is attached. The heat sink may project out so as to mount onto additional external heat sink components (not shown). The black glass or other absorbing layer, and associated cooling means is effective as a beam dump for light passing along the "off" paths 24*b*, 24*c* as described in relation to FIG. 2.

In this crossed dichroic mirror arrangement the splitting and recombining regions of the dichroic mirrors 49*a* and 49*b* are physically placed one above the other to form a cross when viewed in plan view. As explained above in relation to FIGS. 1, 2 and 3, the reflected beam from each array 10*a*, 10*b*, 10*c* is deflected vertically from the incident beam onto the array. Thus the vertically arranged mirrors 49*a* and 49*b* may be divided into distinct splitting and recombining regions permitting different characteristic coatings to be used on the mirrors for splitting the incident light and recombining the light to form the multi-coloured spatially modulated beam.

The light beams can be arranged such that the dichroic surfaces 49*a* and 49*b* lie at the same angle to the incident multi-colour beam and the spatially modulated beams from the arrays 10*a*, 10*b*. Such an arrangement avoids light losses as is described in the applicant's international application no. WO 92/13424, the contents of which are incorporated herein by reference. In particular the arrangement will avoid light losses due to the spectral response of the dichroic mirrors 49*a* and 49*b* being dependent upon the angle of incidence of light upon the splitter. However, in an alternative arrangement the beams passing in the two directions through each of the dichroic surfaces 49*a* and 49*b* may be tilted relative to each other by, for example adjustment of the alignment of the input beam 43, the mirror 42 and/or the totally internal reflecting surface 40. This may be designed to achieve a controlled loss at the dichroic surfaces 49*a* and/or 49*b*, and thereby enhance the quality of the primary colours.

The prism assembly 41 is made of any convenient optical glass, for example BK7 optical crown glass. The black glass layer 51 has a refractive index matched to that of the prism 41. Thus for example the black glass layer may be type NG1 available from Schott. The chosen thickness of the black glass layer 51 will be a compromise between light absorption, and heat conduction and will typically be of 0.5 millimetres thickness.

The arrays 10*a*, 10*b*, 10*c* may optionally be cemented onto the appropriate facets of the prism 41 using a suitable cement, or may be coupled using optical coupling fluid. Alternatively the arrays 10*a*, 10*b*, 10*c* may be movable relative to the facets, in order to allow alignment of the arrays.

The air gaps 45*a*, 45*b*, 45*c* formed in the prism assembly 41 will typically be 10 microns thick. The air gaps may be defined by means of recesses in the glass of the prism assembly. Alternatively spacers, for example mica or loops of fine metal wire, may be used to produce air gaps of very accurate spacing. The spacers will be attached to the prism assembly using some form of cement the choice of which will be obvious to a person skilled in the art of projection systems, the spacers being thermally matched to the glass of the prism assembly.

The light from the lamp 16 may contain substantial power in the infra red and ultra violet frequency bands. The infra red radiation is undesirable because it heats the optical components leading to potential misalignment. The ultra violet radiation is undesirable as it may affect the cement which holds the prism components together. Thus the front convex surface of the condenser lens (not shown) which is used to focus light from the light source 16 onto the prism assembly 41 may be coated with a coating which transmits visible light but reflects infra red and/or ultra violet radiation. The surface through which the light beam 43 enters the prism assembly 41 may also advantageously be coated with a filter coating 50 to reduce further the level of infra red and/or ultra violet unwanted radiation. Either of these coatings may also be designed to trim the spectral distribution of the light from the lamp 16 which passes into the optical system. This is of course additional to the mirror arrangement 42 and 46 described above which also directs infra-red light to a heat sink.

Within the prism assembly 41, any light which does not illuminate each of the arrays 10a, 10b, 10c may also cause loss of contrast in the final projected image. Thus provided that the faces 40a, b, c can still be arranged to totally internally reflect the incident beams 43, the external surfaces of the prism assembly 41 may advantageously be surrounded by black glass (not shown) as described above in relation to layer 51, and backed by heat sinks (not shown). Alternatively, there may be provided means for directing this stray light into a light dump, this light dump possibly being external to the prism assembly 41.

It will be seen that the optical arrangement shown in FIGS. 4a, 4b and 4c is particularly compact due to the incorporation of the air gaps 45a, b and c into the dichroic splitting cross structure formed by the dichroic surfaces 49a and 49b.

SECOND EMBODIMENT

Figure 6A:
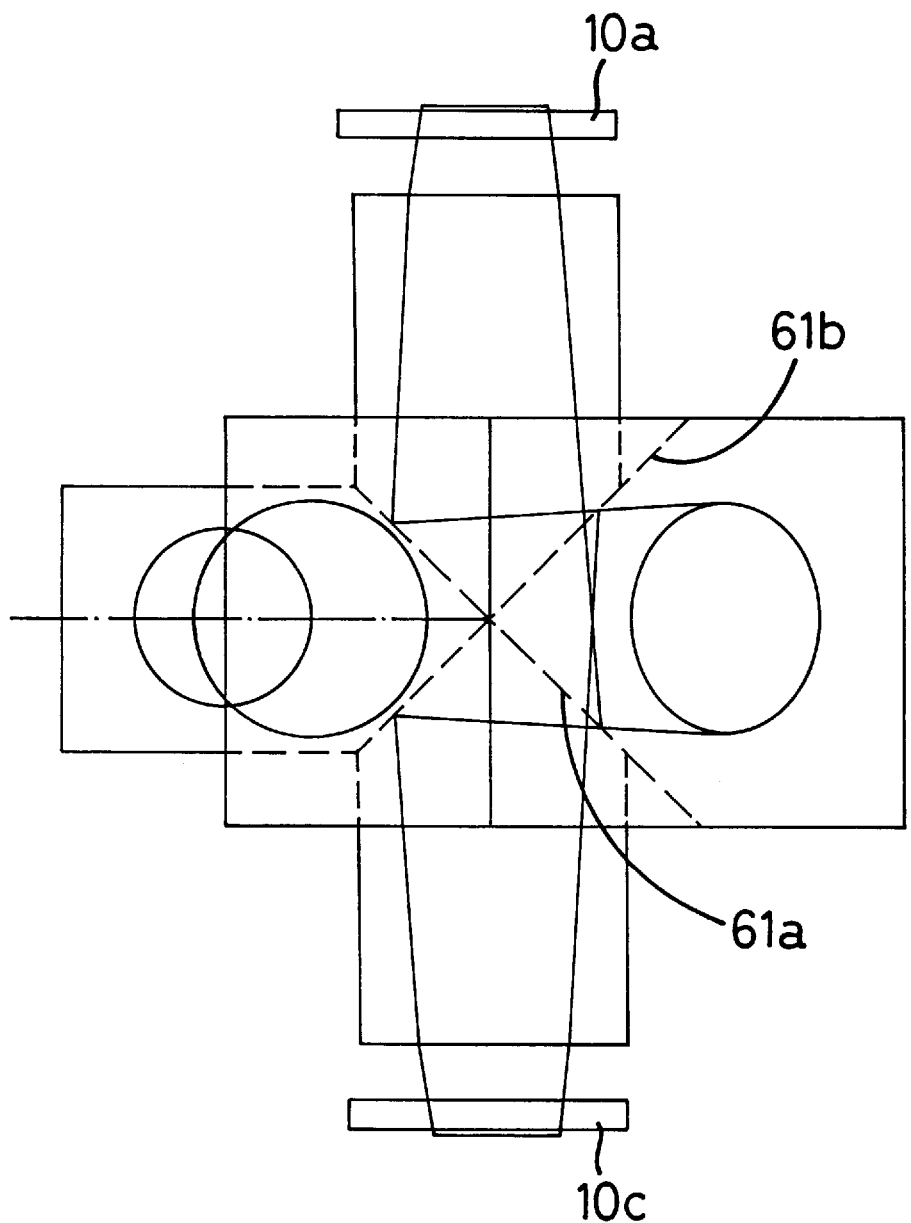
FIG. 6a shows a scaled plan view of part of a second embodiment of a spatial light system in accordance with the invention.
Figure 6C:
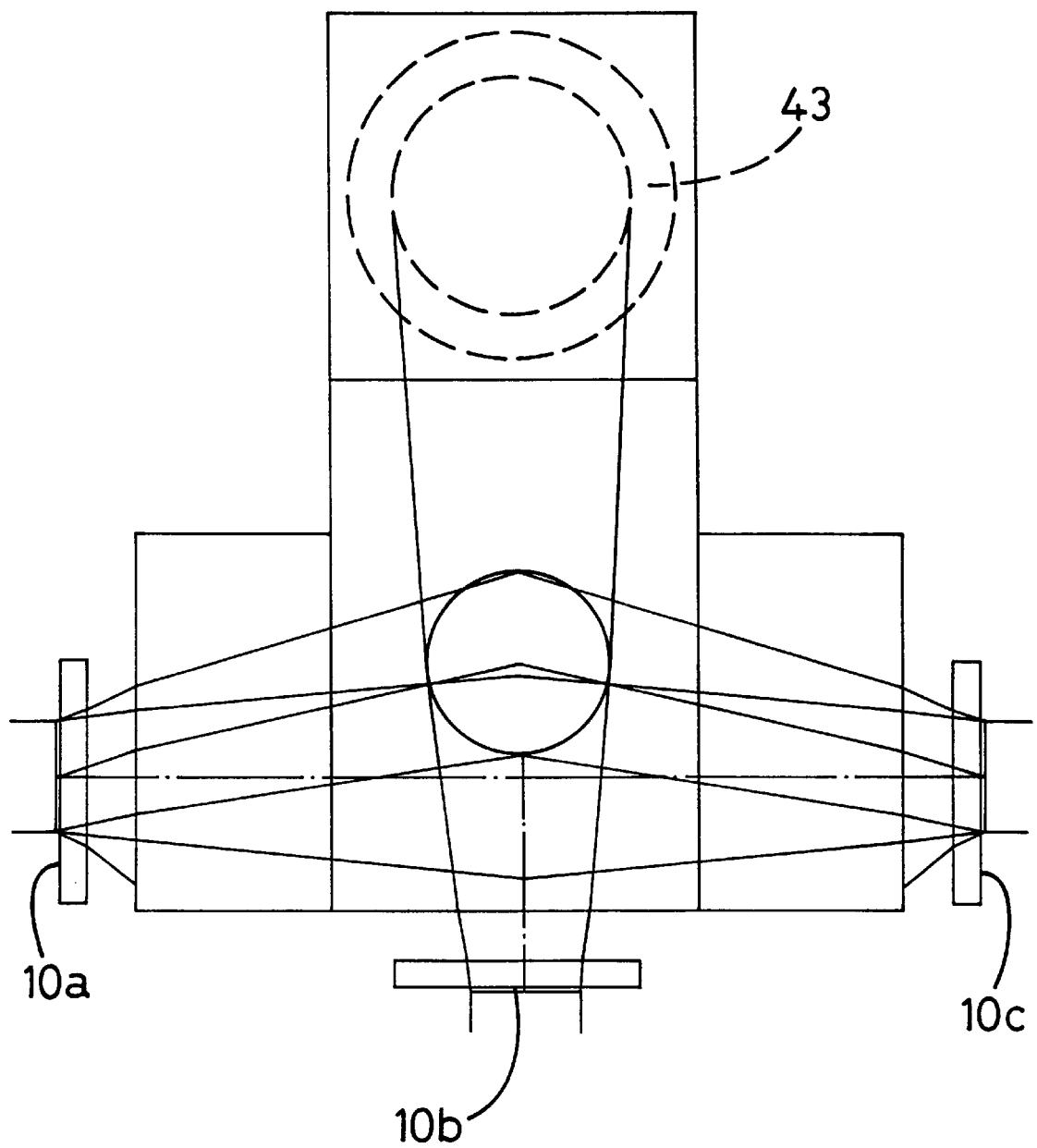

Turning now to FIGS. 6a, 6b and 6c, these Figures show a second embodiment of the present invention in which the prism assembly incorporates two crossed, dichroic colour splitting mirror surfaces and two total internally reflecting surfaces with a single discriminating air gap 63. The dichroic mirrors are shown as dotted lines 61a, b in FIG. 6a. The air gap 63 is best seen in FIG. 6b.

In this embodiment the single air gap 63 is arranged to direct and collect light to and from each of the arrays 10a, 10b, 10c. The input beam is reflected onto the air gap 63 via an internal surface of the prism assembly, the green component of the light passes directly through the dichroic mirrors 61a, b, onto the array 10b via the second total internally reflecting surface. The red and blue light components are then split off from the beam 43 by the dichroic surfaces 61a, b such that blue light is incident on the array 10a and red light is incident on the array 10c. The spatially modulated light from the arrays 10a, 10b, 10c is then recombined at the dichroic surfaces 61a, b, and passes out of the prism assembly through the air gap 63.

It will be noted that the prism assembly shown in FIG. 6b does include a triangular air gap between two parts of the assembly. This is merely for simplicity of illustration.

THIRD EMBODIMENT

Figure 7:
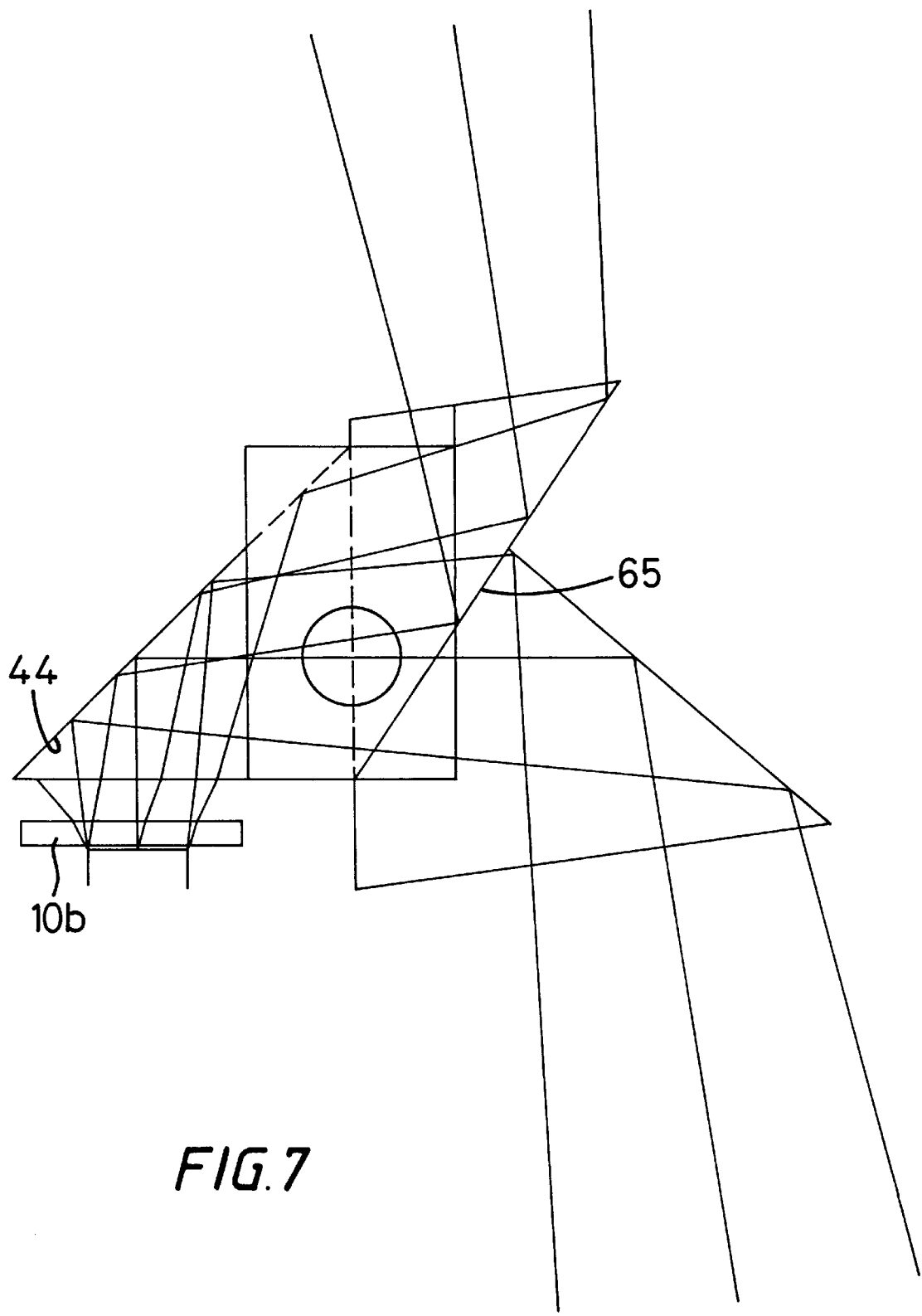
FIG. 7 shows a side elevation of part of a third embodiment of a system in accordance with the invention, the embodiment being a variation of the second embodiment.

FIG. 7 shows an adaptation of the embodiment shown in FIG. 6. This further embodiment also has a single air gap 65 and two crossed dichroic surfaces 61a, b (not seen in FIG. 7) as in the second embodiment. In the embodiment shown in FIG. 7, however, the prism arrangement is different to that of FIG. 6 in order to illustrate an alternative possibility for arranging the input and output light paths. In this embodiment the input and output light paths are parallel and substantially coaxial due to the input surface of the prism assembly being rotated relative to that shown in FIGS. 6b and the inclusion of a further internal reflecting surface effective to reflect the output beam.

It will be appreciated that many other adaptions are also possible as dictated by the needs of the projector system.

FOURTH EMBODIMENT

Turning now to FIGS. 8a and 8b, in this embodiment two dichroic mirrors 83a, 83b are arranged in series such that the colour splitting of the input beam is sequential. A single air gap 81 is incorporated in the prism assembly 41, continuous with a totally internally reflecting surface 85. The surface 85 is effective to fold the input beam to reduce further the size of the system.

FIFTH EMBODIMENT

Figure 9:
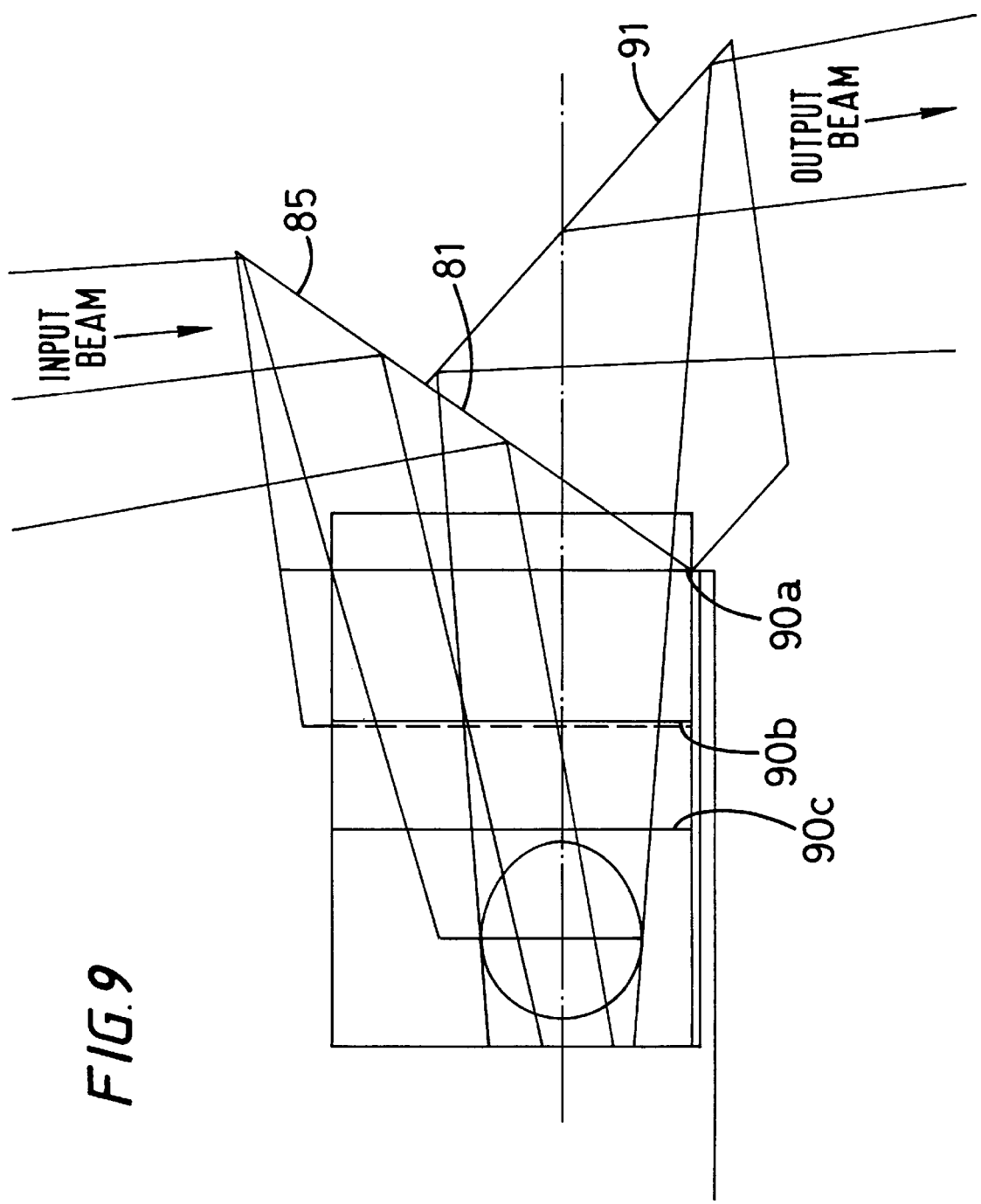
FIG. 9 shows a side view of a fifth embodiment of a system in accordance with the invention, the embodiment being a variation of the fourth embodiment.

FIG. 9 shows a side view of a fifth embodiment which is an adaptation of the fourth embodiment shown in FIGS. 8a and 8b.

The prism assembly shown in FIG. 9 effects serial colour splitting with three dichroic surfaces 90a,b,c, and uses a single air gap, again shown as 81. The prism input and output arrangements are differently configured to accommodate this arrangement, using a totally internally reflecting surfaces 85, continuous with the air gap face 81, and a further totally internally reflecting surface 91.

SIXTH EMBODIMENT

Figure 10A:
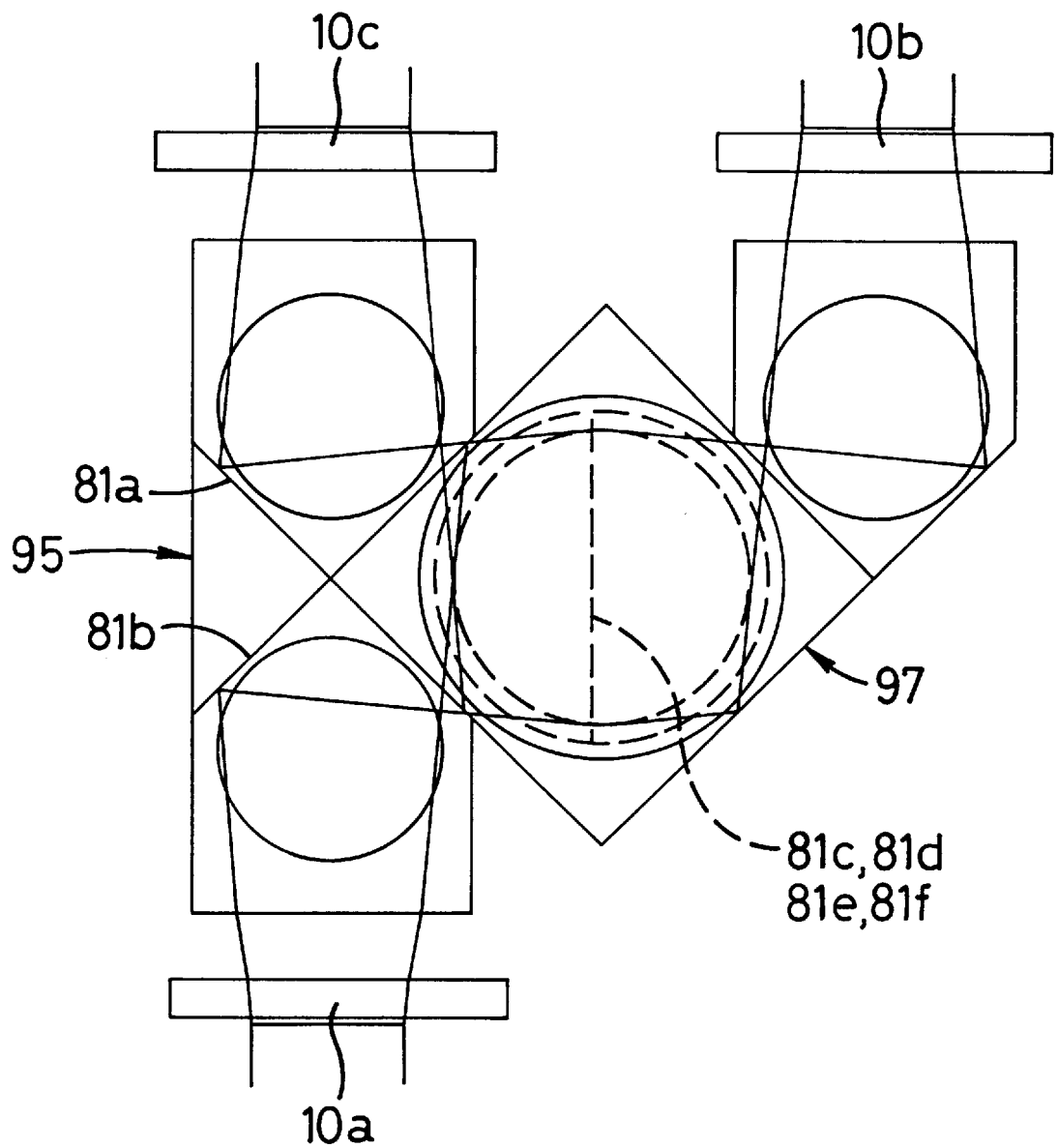
FIG. 10a shows a scaled plan view of part of a sixth embodiment of a spatial light system in accordance with the invention.
Figure 10B:
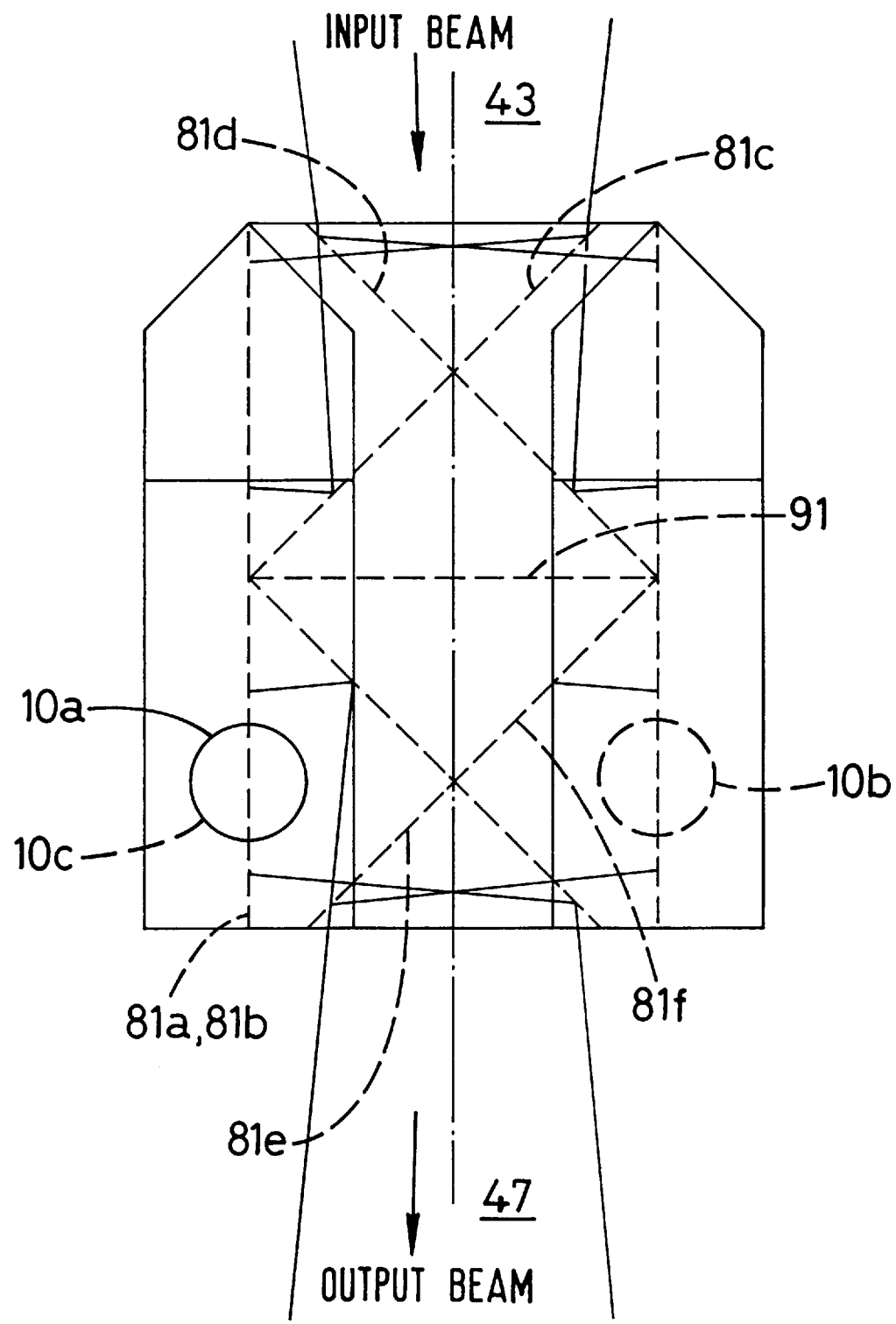
Figure 10C:
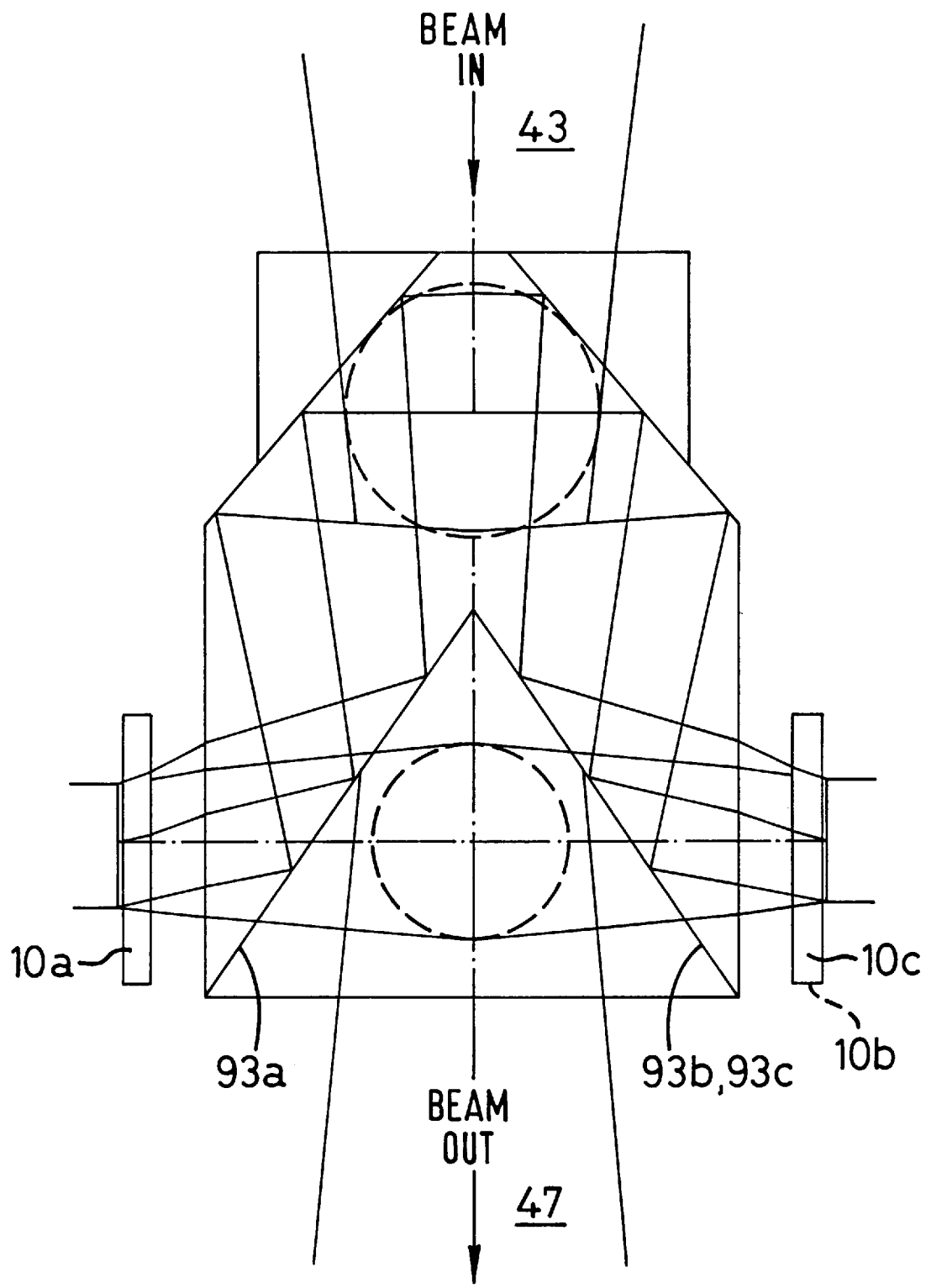

FIGS. 10a, 10b and 10c show a sixth embodiment in which the prism assembly includes a combination of crossed and serial dichroic surfaces in which three pairs of crossed dichroic surfaces 81a, 81b and 81c, 81d and 81e, 81d are combined in series. Three air gaps 93a, 93b, 93c are provided in the prism assembly, each being effective to direct light to and receive spatially modulated light from one of the arrays 10a, 10b, 10c.

In the arrangement shown in FIGS. 10a, 10b and 10c, the input beam is split by dichroic surfaces 81c and 81d into one primary colour which is directed towards array 10b with the remaining secondary light being directed towards the second pair of dichroic surfaces 81a and 81b. The surfaces 81a and 81b split the secondary light into two beams, each of one of the remaining two primary colours each of which is directed towards one of the arrays 10a and 10c. The three primary light beams are reflected from one of the air gaps 93a, 93b or 93c to the adjacent array 10a, 10b or 10c. The spatially modulated beams from the arrays 10a, 10b, 10c are then recombined at the dichroic surfaces 81a, 81b and 81e, 81f after passing through the air gaps 93a, 93b and 93c so as to form the output beam 47.

This particular optical design is particularly compact and has the further advantage that the input beam 43 is coaxial with the output beam 47. The system also has the advantage that the dichroic surfaces 81c and 81d can be arranged to send only useful light to the arrays 10a, 10b and 10c. The internal reflecting surface 91 can be arranged to reflect waste radiation, for example infra-red radiation back towards the light source or at an angle to the optical axis for disposal. Alternatively or additionally the surface 91 can be arranged to pass non-visible waste radiation on through the dichroic surfaces 81e and 81f into the output beam 47 for projection by the projection lens (not shown in FIG. 10a and 10b), this alleviating heat management problems in the projector system at the expense of a slight heating of the screen due to the projection of the low level waste radiation onto the projector screen (not shown in FIGS. 10a and 10b).

It will be seen that the dichroic surfaces 81a and 81b have the advantages of the crossed dichroic surface configuration described in relation to the first embodiment.

The external faces 95 and 97 of the prism arrangement shown in FIG. 10a may be used for extraction of unwanted radiation within the input beam, for example by cladding these surfaces with black glass.

It will be seen that in the above arrangement, as there are four splitting surfaces 81c, 81d, 81a and 81b and four recombining surfaces 81a, 81b, 81e and 81f which are all independent of each other, very tight colorimetry and infrared control is possible.

SEVENTH EMBODIMENT

Figure 11:
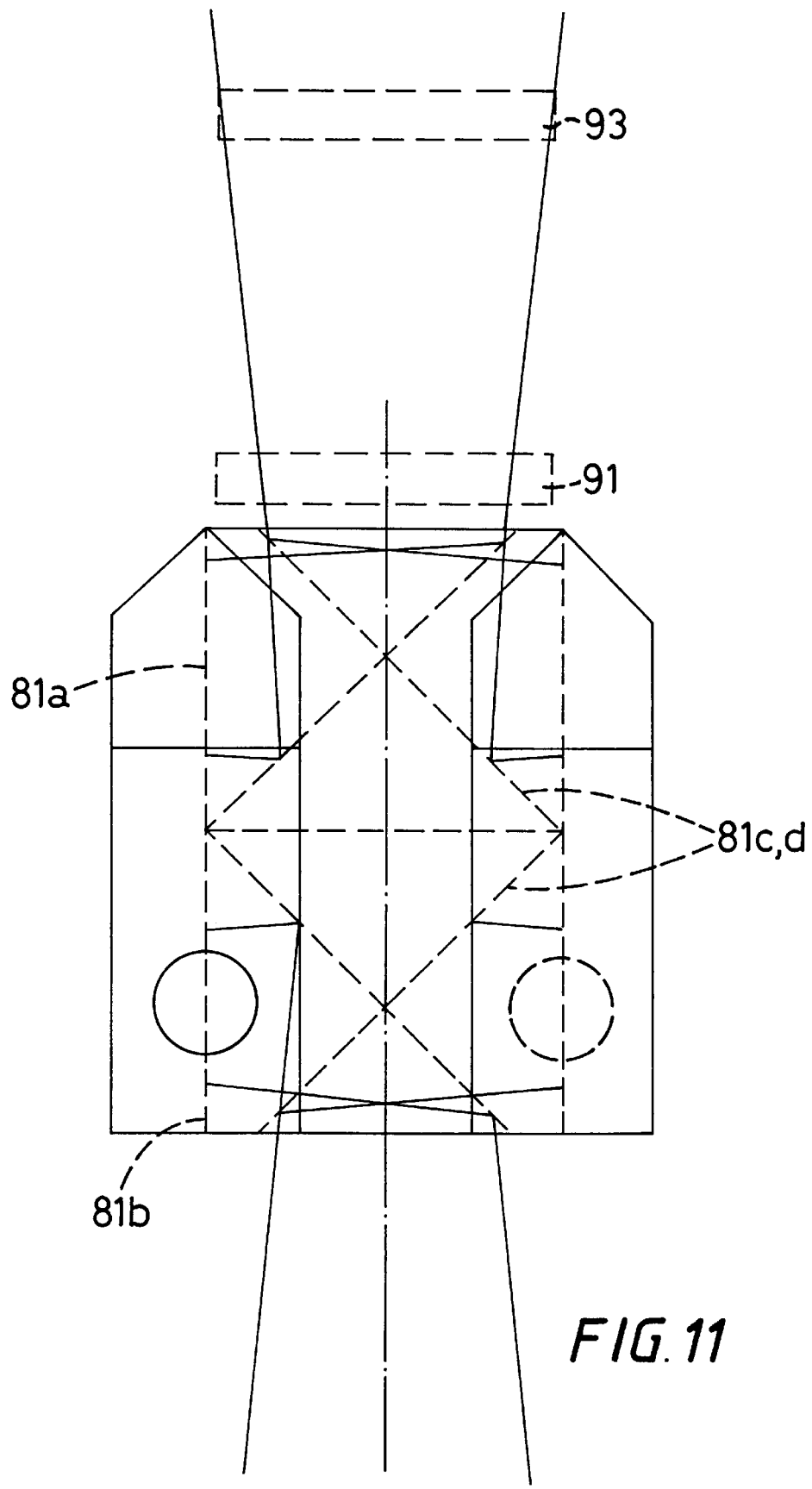
FIG. 11 is a side view of a seventh embodiment being an adaptation of the embodiment shown in FIG. 10.

Turning now to FIG. 11, in this embodiment the embodiment shown in FIG. 10 is adapted for use with a double lens lenticular system for producing light beams on each of the arrays 10a, 10b, 10c of a cross section matched to the active area of the arrays 10a, 10b, 10c. This takes advantage of the compact paths within the prism of FIG. 10. Thus FIG. 11 shows an adaptation of the embodiment of FIG. 10 incorporating two lenticular lenses 91 and 93.

It will be appreciated that whilst the projection systems shown in FIGS. 4 to 11 use the colour splitting scheme shown schematically in FIG. 3, other colour splitting schemes may be used in a system in accordance with the invention, for example a scheme using the three colours magenta, cyan and yellow, or using more than three colour component beams. A system in accordance with the invention may also use the colour splitting mirrors to improve the balance of light modulated the spatial light modulators.

In some applications it may be advantageous to add a further array to the three arrays 10a, 10b, 10c used in a colour projection system. Such a further array may be for example used for power handling reasons as for example disclosed in the applicant's co-pending UK application nos. 9415771.6 and 9418863.8, the contents of which are incorporated herein by reference. Thus, for example it may be advantageous to arrange for the green colour channel to be split between two arrays, the fourth array for example being situated opposite the array 10b adjacent to the array 10a in FIG. 10a.

Whilst a projection system in accordance with the invention has particular application in a colour projection system in which one or more colour splitting means are used to split the incoming light between two or more spatial light modulators, a projection system in accordance with the invention also has advantages in a monochrome system or in a colour system using sequential colour projection, for example using a colour wheel in which the projection system does not incorporate colour splitting/combining surfaces.

EIGHTH EMBODIMENT

Figure 12:
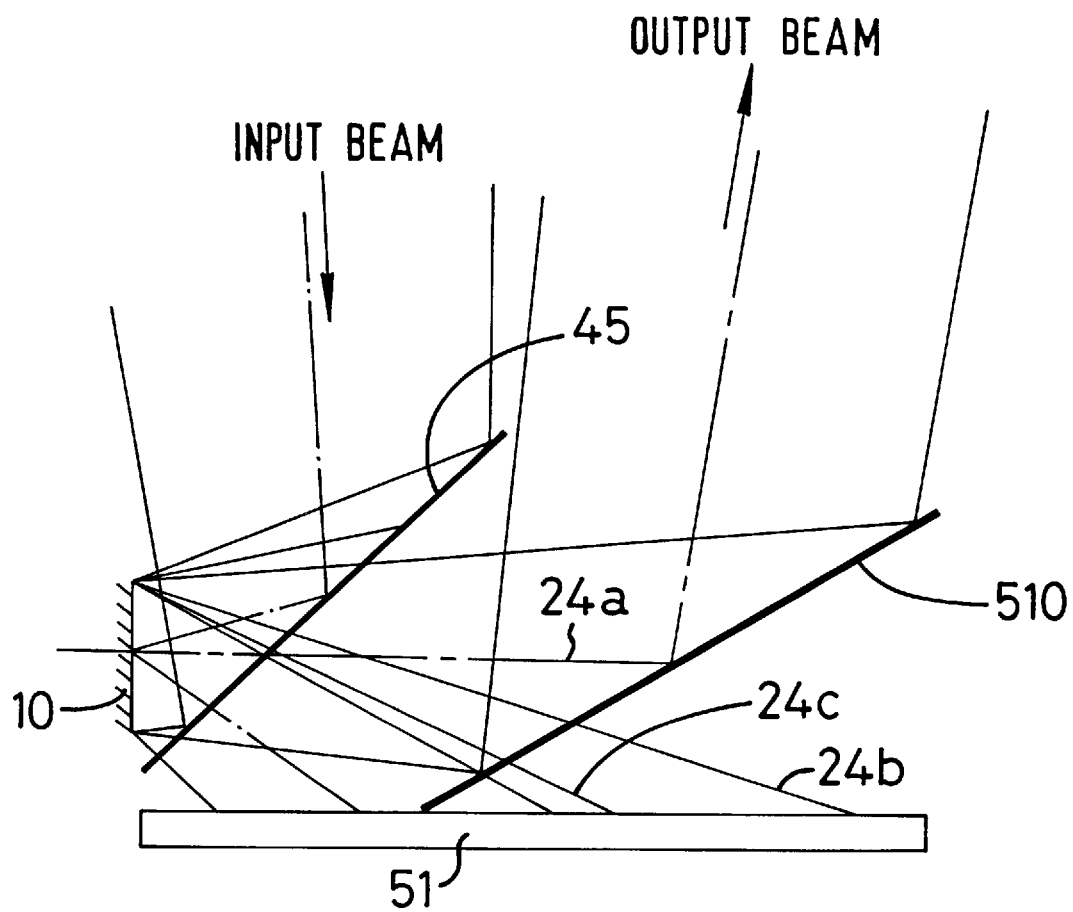
FIG. 12 is a schematic diagram illustrating an eighth embodiment of the invention.

Turning now to FIG. 12, it will be seen from this Figure that it is possible to separate the spatially modulated light reflected from an array 10 along the "on" path 24a, from the light passing along the "off" paths 24b and 24c by folding the light path 24a using a further air gap 510 as shown. The incoming light is reflected by the first air gap 45 onto an array 10 as in the earlier embodiments.

By using the air gap 510 including a total internal reflection surface to fold the useful output beam passing along the "on" path 24a from the array 10, it is possible to arrange that any reject light in the "off" paths 24b, 24c meeting the air gap 510 is at a steep angle such that it is transmitted by the air gap to the output face 512 and then into a beam dump (not shown). Alternatively, the absorbing layer 51 described in relation to the first embodiment may be used as the beam dump. The "on" light along path 24a is reflected by the air gap 510 due to the properties of the total internal reflection surface, so as to enter the projection lens (not shown in FIG. 12). This allows an increase in the effective aperture of the projection lens beyond the size previously possible, thus increasing the system's efficiency.

NINTH EMBODIMENT

Figure 13:
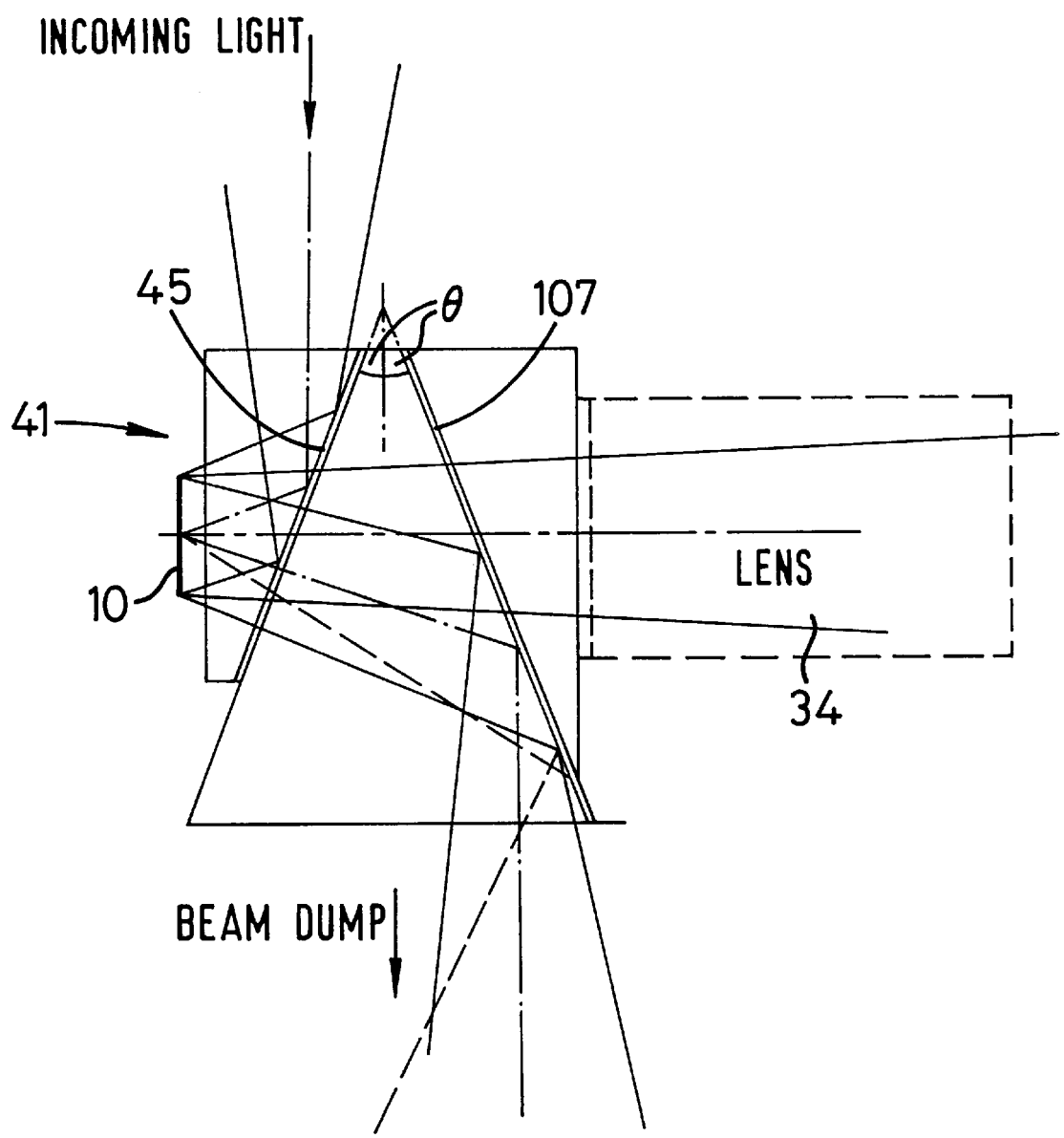
FIG. 13 is a schematic diagram showing a ninth embodiment of the invention.

Turning now also to FIG. 13, in this embodiment of the invention the incoming light enters the prism assembly 41, and light is reflected from the total internal reflection surface of the air gap 45 onto the single array 10 in analogous manner to the earlier embodiments. Light reflected from the deformable mirror device array 10, which is set at an angle of 10°, is reflected normally towards the projection lens 34. However non-image forming light reflected from the deformable mirror device array 10 at 20° or 40° to the normal to the array is reflected from the second total internal reflection surface at the air gap 107 and is directed to a beam dump (not shown). This reduces the path from the light valve 10 to the projection lens 34 and can either improve system efficiency or allow a smaller and cheaper projection lens to be used.

It can be seen in this embodiment, the astigmatism created in the system due to the air gap 45 is eliminated completely by the further air gap 107, the air gap 107 being placed at an angle 6 with respect to the optical axis which is exactly equal and opposite to that of air gap 45.

However compensation of astigmatism may also be affected at the air gap 107 where air gap 107 is not at an equal and opposite angle with respect to the optical axis to that of air gap 45, provided that the gap size is adjusted.

It will also be appreciated that a single air gap may be used to divert the unwanted light where an air gap is not used to direct light onto the spatial light modulators.

It will also be appreciated that whilst the spatial light modulators array described by way of example are deformable mirror devices, a projection system in accordance with the invention also finds application where other reflective spatial light modulators such as reflective liquid crystal devices are used.

We claim:

1. A display device for use in a projection apparatus comprising:

a light source;

means effective to direct a beam of light onto at least one deformable mirror array, the deformable mirror array being effective to reflect the light beam to produce a spatially modulated beam at a non zero angle to the incident beam;

wherein the light path to the deformable mirror array comprises a prism assembly including at least two air gaps effective to cause the incident light beam to pass along a first direction to be incident on said one deformable mirror device, and to cause the spatially modulated light beam produced by said one deformable mirror device to pass along a second direction different from the first direction, the two air gaps being arranged to provide mutual compensation for astigmatism.

2. A display device according to claim 1 wherein one of said air gaps is effective to cause the spatially modulated light beam to pass in said second direction towards a projection means, and the other of said air gaps is effective to direct the part of the light incident on the deformable mirror array not included in the spatially modulated light beam in a third direction different from the second direction towards a beam dump.

3. A display device for use in a projection apparatus comprising:

a light source;

means effective to direct a beam of light onto at least one deformable mirror array, the deformable mirror array being effective to reflect the light beam to produce a spatially modulated beam at a non zero angle to the incident beam;

wherein the light path to the deformable mirror array comprises a prism assembly including at least two air gaps effective to cause the incident light beam to pass along a first direction onto said one deformable mirror device, and to cause the spatially modulated light beam produced by said one deformable mirror device to pass along a second direction different from the first direction, the light paths in and out of the prism assembly being substantially coaxial.

4. A display device according to claim 3, in which there are three deformable mirror arrays and three air gaps.

5. A display device for use in a projection apparatus comprising:

a light source;

means effective to direct a beam of light onto at least one deformable mirror array effective to reflect the light beam incident on the array to produce a spatially modulated beam at a non zero angle to the incident beam; and at least one dichroic surface for splitting light from the light source into different colour component beams and subsequently recombining the spatially modulated light into a single beam, in which said dichroic surface is arranged such that the beams to and from the deformable mirror device intersect the dichroic surface at two different regions of the surface, and the dichroic surface is designed such that the first and second regions have different spectral characteristics.

6. A display device for use in a projection apparatus comprising:

a light source;

means effective to direct a beam of light onto a plurality of deformable mirror arrays, each effective to reflect the light beam incident on the array to produce a spatially modulated beam at a non zero angle to the incident beam;

including at least one dichroic surface arranged to split light from the light source into different colour component beams and subsequently to recombine the spatially modulated light into a single beam, wherein the dichroic surface is arranged such that the beams to and from the deformable mirror device intersect the dichroic surface at different angles thereby to achieve a controlled loss at the dichroic surface and adjust the colorimetry of the display device.

7. A display device according to claim 5 or 6 in which the light path to the deformable mirror array comprises a prism assembly including at least one air gap effective to cause the incident light beam to pass along a first direction onto said one deformable mirror device, and to cause the spatially modulated light beam produced by said one deformable mirror device to pass along a second direction different from the first direction.

8. A display device according to claim 7, wherein there are provided an equal number of air gaps as the number of deformable mirror arrays.

9. A display device according to claim 7, wherein a single air gap is used to direct light onto a plurality of deformable mirror arrays.

10. A display device according to any one of claims 1, 3, 5 and 6, including means for directing incident infra-red light in a different direction to the spatially modulated light produced by each deformable mirror array.

11. A display device according to claim 6, wherein there are a plurality of dichroic surfaces some of which are arranged sequentially in the light path to the spatial light modulators and some of which are arranged in a crossed configuration.

12. A projection apparatus comprising:

a light source;

at least one deformable mirror array;

means effective to direct a beam of light onto said at least one deformable mirror array, the deformable mirror array being effective to reflect the light beam to produce a spatially modulated beam at a non zero angle to the incident beam;

wherein the light path to the deformable mirror array comprises a prism assembly including at least two air gaps effective to cause the incident light beam to pass along a first direction to be incident on said one deformable mirror array, and to cause the spatially modulated light beam produced by said one deformable mirror array to pass along a second direction different from the first direction, the two air gaps being arranged to provide mutual compensation for astigmatism.

13. A projection apparatus comprising:

a light source;

at least one deformable mirror array;

means effective to direct a beam of light onto said at least one deformable mirror array, the deformable mirror array being effective to reflect the light beam to produce a spatially modulated beam at a non zero angle to the incident beam;

wherein the light path to the deformable mirror array comprises a prism assembly including at least two air gaps effective to cause the incident light beam to pass along a first direction onto said one deformable mirror array, and to cause the spatially modulated light beam produced by said one deformable mirror array to pass along a second direction different from the first direction, the light paths in and out of the prism assembly being substantially coaxial.

14. A projection apparatus comprising:

a light source;

at least one deformable mirror array;

means effective to direct a beam of light onto said at least one deformable mirror array effective to reflect the light beam incident on the array to produce a spatially modulated beam at a non zero angle to the incident beam; and at least one dichroic surface for splitting light from the light source into different color component beams and subsequently recombining the spatially modulated light into a single beam, in which said dichroic surface is arranged such that the beams to and from the deformable mirror array intersect the dichroic surface at two different regions of the surface, and the dichroic surface is designed such that the first and second regions have different spectral characteristics.

15. A projection apparatus comprising:

a light source;

means effective to direct a beam of light onto a plurality of deformable mirror arrays, each effective to reflect the light beam incident on the array to produce a spatially modulated beam at a non zero angle to the incident beam;

including at least one dichroic surface arranged to split light from the light source into different color component beams and subsequently to recombine the spatially modulated light into a single beam, wherein the dichroic surface is arranged such that the beams to and from the deformable mirror device intersect the dichroic surface at different angles thereby to achieve a controlled loss at the dichroic surface and adjust the colorimetry of the display device.

16. A projection apparatus of any one of claims 12, 13, 14 or 15 further including a display surface.

* * * * *

UNITED STATES PATENT AND TRADEMARK OFFICE
CERTIFICATE OF CORRECTION

PATENT NO. : 5,865,520
DATED : Feb. 2, 1999
INVENTOR(S) : Kavanagh et al.

It is certified that error appears in the above-identified patent and that said Letters Patent is hereby corrected as shown below:

Column 10, line 25, "angle 6" should read --angle θ--.

Column 11, line 5, "angleto" should read --angle to--

Signed and Sealed this

Thirteenth Day of July, 1999

Attest:

Q. TODD DICKINSON

Attesting Officer

Acting Commissioner of Patents and Trademarks